Jan. 10, 1967                NAOTARO OKAZAKI                3,296,659
           CROSS-HEAD OF AN EXTRUDER ADAPTED FOR PROVIDING
                   UNIFORM FLOW OF EXTRUDED MATERIAL
Filed Oct. 13, 1964                                  2 Sheets-Sheet 1

United States Patent Office 3,296,659
Patented Jan. 10, 1967

3,296,659
CROSS-HEAD OF AN EXTRUDER ADAPTED FOR PROVIDING UNIFORM FLOW OF EXTRUDED MATERIAL
Naotaro Okazaki, 72 Hakuraku, Yokohama-shi, Japan
Filed Oct. 13, 1964, Ser. No. 403,457
10 Claims. (Cl. 18—12)

This invention relates to an improved cross head of an extruder for making rubber or plastic coated wire products or tubings of rubber or plastic material.

Plastic in the cross head, and results produces fundamental defect which unbalances the flow of plastic in the cross head, to produce an eccentric extrusion, for instance, a cover or tubing having uneven thickness around its periphery.

Heretofore many efforts have been made to eliminate the eccentricity. It has been found that this eccentricity of the material is caused by the uneven flow of the material around the core tube which is mounted in the cross head. This eneven flow results from the difference of resistance to flow of the material between two passages one along the extruder side of the core tube and the other along the opposite side.

The usual procedure for avoiding eccentric extrusion is by the so-called "eccentric adjustment," however this expedient does not eliminate the very origin of the eccentric extrusion of the material.

A primary object of the present invention is to provide an improved cross head assembly which produces an extrudable mass from the discharge end of the extrusion cylinder, through the cross head to the extrusion die, in such manner that the mass will be delivered to the die aperture throughout its cross-section at a volumetric flow rate which is uniform so as to preclude any uneven flow of the material around the core tube by providing a "flow balancer."

The above and other objects of the present invention are accomplished by the cross head of the invention which comprises a head having a longitudinal aperture and a lateral inlet which leads to the aperture and which is located intermediate the ends of the head; and extrusion die in one end of said aperture; a stationary sleeve fitted into said aperture in line with said die, said sleeve having in its outer periphery single or multiple helical grooves having an inclined bottom surface which increases in diameter in the direction of passage of the material and a rotatable core tube in the sleeve.

According to the novel cross-head of the present invention, the unbalanced flow of the material around the core tube can be completely eliminated, therefore no "eccentric adjustment" is required regardless of size of the cover or tube and the extrusion speed.

The present invention will be more fully understood from the following description considered in conjunction with the accompanying drawings.

In the accompanying drawings, certain modes of carrying out the present invention are shown for illustrative purposes.

Figure 1:
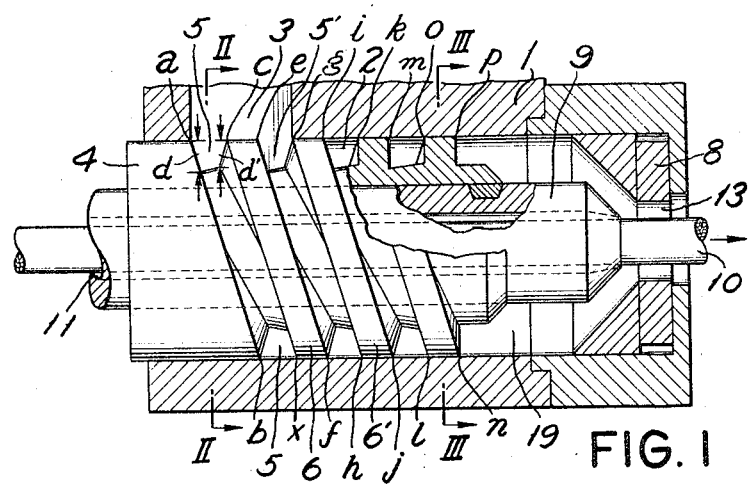
FIG. 1 is a plan view of the horizontal section of a cross head of the extruder according to the present invention.
Figure 3:
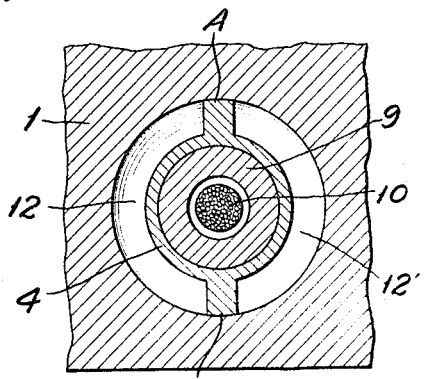
FIG. 3 shows the same vertical cross section as taken on the line III—III of FIG. 1.

Referring to the drawings, and more particularly to FIG. 1 and FIG. 3 thereof, the reference numeral 1 designates a cross head of the present invention, which has a longitudinal aperture 2 and a lateral inlet 3. The head is tightly fitted to the discharge end of a conventional extruder (not shown in drawing). As stationary sleeve 4 is positioned in the aperture 2 of the cross head 1 with its outer periphery in contact with the inner surface of the cross head 1. On the outer periphery of the sleeve 4 is provided double grooves 5, 5' formed by double screw therads 6, 6', each helical groove having an inclined bottom surface which decreases in depth toward the discharge end of the cross head. Thus as seen in FIG. 1, the depth $d$ at the rear end of the helical groove is larger than that of $d'$. Both helical grooves start at the position of the inlet 3 and end at the opposite points A, A' in the same circle of the outer periphery of the sleeve. The shape and dimensions of the inlet 3 is substantially the same as that of the entrance of the grooves 5, 5' of the sleeve. A core tube 9 is rotatably supported in the sleeve 4 and a die 8 is fixed at the end of the aperture 2. Wire 10 which is wire to be coated with rubber or plastic, is passed through the bore 11 of core tube 9 which is in the sleeve 4.

Figure 2:
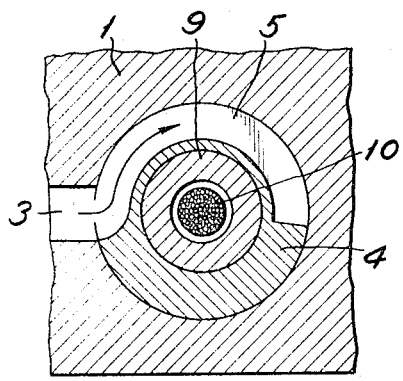
FIG. 2 shows the vertical cross section as taken on the line II—II of FIG. 1.

In the cross head, the material discharged from the extruder cylinder enters into helical grooves 5 and 5' and advances helically through said grooves in only one direction as shown in FIG. 2. Then said material passes through the clearances 12 and 12' at the end of the helical grooves to the tubular passage 19 between the wall of the aperture 2 and the core tube 9 and advances into the die opening 13 for the formation of a cover on the continuous wire 10.

With respect to the flow stream line of the material delivered through a helical groove, the length of any flow stream line varies depending on the location where said material passes in the width of the groove. For instance, the length of a stream line along points $a, b, i, j$ and $p$ is two turns, whereas that along points $c, x, k$ and $l$ is one and a half turns, that is the former is longer than the latter. Stated otherwise the length of the front surface $(a, b, i, j, p)$ of the thread is 2 turns while the length of the back surface $(c, x, k, l)$ of the thread is 1½ turns. Thus, the ratio of the length of the front surface of the thread to that of the rear surface of the thread as measured from the inlet 3 is 2:2½. Resistance against the flow of material is proportional to its length of passage, i.e., the length of stream line.

In the cross head according to the present invention, the bottom surface of the groove so inclines across the width of the groove that the depth of the groove is deep at the position where the stream line is long but shallow at position where stream line is short. For example, in the head shown in FIG. 1, the depth $d$ along line $a$ and $b$ is deeper than $d'$ along line $c$ and $x$ in the ratio of about 2:1.5. The flow rate of material is even at all positions in the width of the groove and any origin of flow unbalance is completely eliminated. Hereafter the sleeve 4 is called a "flow balancer." Furthermore in the new head of this invention, the two screw threads 6 and 6', end at the same surface around the flow balancer, whereby both end clearances 12 and 12' of the grooves 5 and 5' are situated at symmetrical positions as shown in FIG. 3.

As a result of the present invention, the same amount of material is delivered in the direction of the die by the flow balancer 4, through the grooves in uniform distribution around the core tube, thereby eliminating any uneven flow of material.

Figure 4:
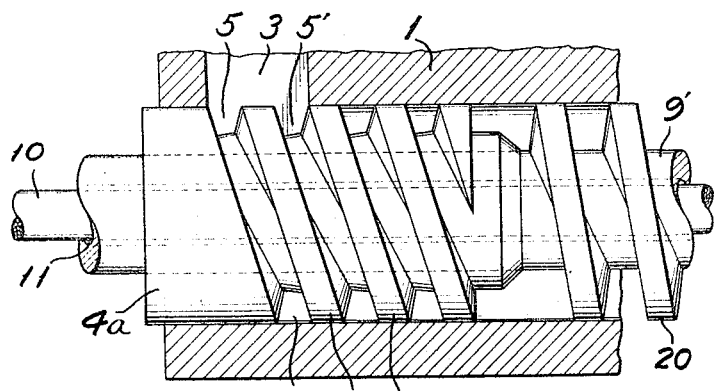
FIG. 4 is a plan view of the horizontal cross section of a modified cross head of the present invention.

In this invention, the core tube 9, if necessary, may be provided with a screw thread 20 at an extended portion 9' as shown in FIG. 4. This screw thread serves to drive forward the delivered material to the die and also to empty the head of residual material when the operation has been finished.

Figure 5:
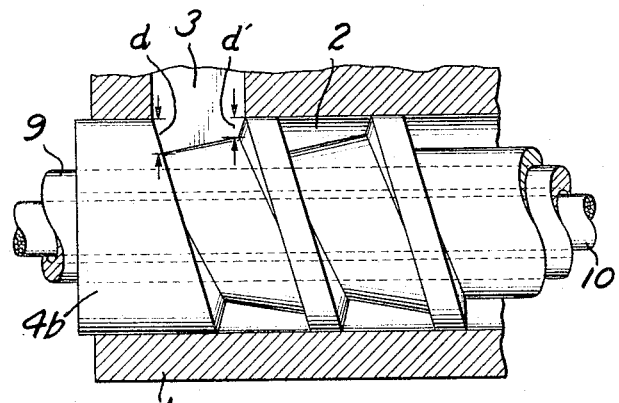
FIG. 5 is a plan view of the horizontal cross section of a further modified cross head.

FIG. 5 shows a modified cross head which has a single threaded sleeve in substitution for the double thread of flow balancer 4 of FIGS. 1–4.

Figures 6, 7:
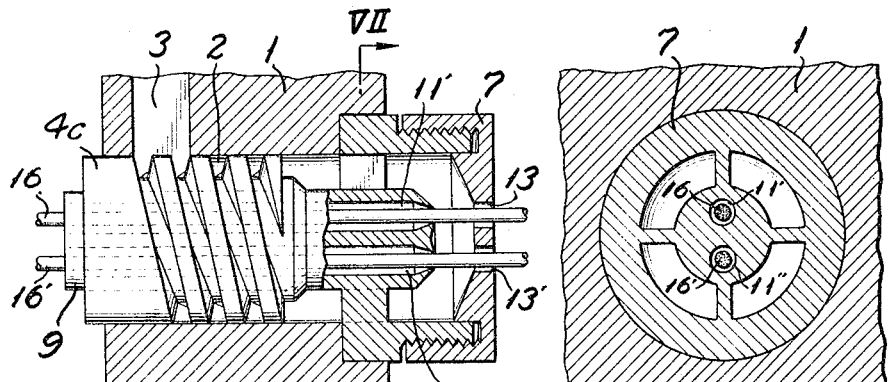
FIG. 6 is a plan view of the horizontal cross section of a further modified cross head for covering a plurality wires.
FIG. 7 shows the section as taken on the line VII—VII of FIG. 6.

FIGS. 6 and 7 show another modified cross head. In this diagram the flow balance 4ᶜ is the same as that shown in FIG. 1, but the core tube 9 has plural bore 11' and 11'' and a die 7 with plural holes 13 and 13'. In this case, both the core tube 9 and die 7 are fixed together and can be rotated at the same time as one body.

Figure 8:
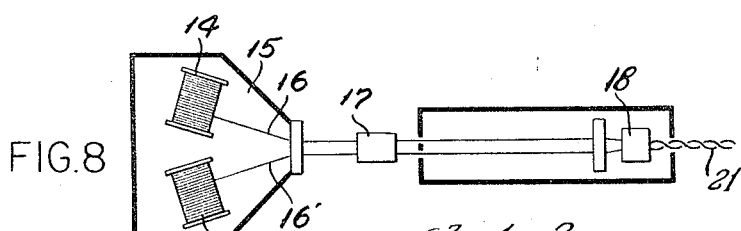
FIG. 8 is a schematic view of an apparatus for producing a twisted insulated wire by the apparatus shown in FIG. 6 and FIG. 7.
Figure 9:
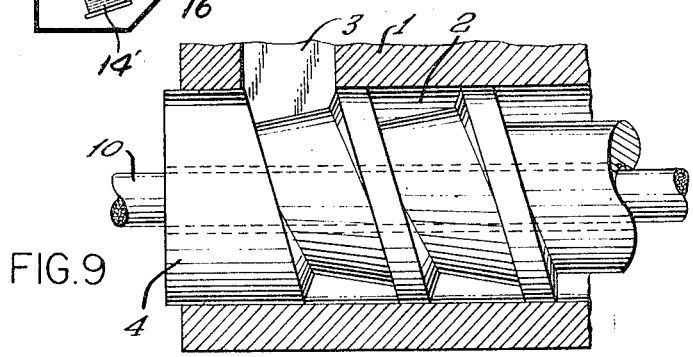
FIG. 9 is a plan view of a horizontal section of another modified cross head.

Referring to FIG. 8, this represents an apparatus for producing twisted insulated wires. Two wires 16 and 16' coming out from bobbins 14 and 14' placed in stranding machine 15, pass through the core tube 9 of the cross head 17 are covered with the material in parallel and passing through a twisting die 18 arranged at the far end. Thus twisted insulated wire 19 is formed. Fig. 9 shows another further modified cross head in which the flow balancer 4ᵈ is constructed in one unit with the core tube. FIG. 9 is an example of a single groove case.

The invention may be carried out in other specific arrangements than those herein set forth without departing from the spirit and scope of this invention as defined in the appended claims.

What is claimed is:

1. A cross head of an extruder comprising a hollow body having an inlet and an outlet, a stationary sleeve in said body, thread means on said sleeve defining with said body a groove constituting a passageway for material from said inlet to said outlet, said thread means having opposite surfaces which bound said groove and which have different lengths as measured from the inlet to the outlet, said opposite surfaces having different depths, the opposite surface with the greater length having the greater depth to establish substantially constant resistance to flow of said material in said passageway whereby uniform flow is obtained therein.

2. A cross head as claimed in claim 1 wherein said thread means comprises first and second adjacent helical threads on said sleeve.

3. A cross head of an extruder comprising a hollow body having an inlet and an outlet and stationary sleeve in said body having a continuous groove and defining with said body a passageway for material from said inlet to said outlet, said sleeve having opposite surfaces which bound said groove and which have different lengths as measured from the inlet to the outlet, said opposite surfaces having different depths, the opposite surface with the greater length having the greater depth to establish substantially constant resistance to flow of said material in said passageway whereby uniform flow is obtained therein.

4. A cross head of an extruder comprising a hollow body having an inlet and an outlet, and a sleeve body in said hollow body in peripheral contact therewith, one of said bodies having a continuous groove defining together with the other body a passageway for material from said inlet to said outlet, said one body having opposite surfaces which bound said groove and which have different lengths as measured from the inlet to the outlet, said opposite surfaces having different depths, the surface of greater length having the greater depth to establish substantially constant resistance to flow of said material in said passageway whereby uniform flow can be obtained.

5. A cross head of an extruder comprising a body having a longitudinal and transverse extent, said body having a longitudinal aperture and a lateral inlet, said body having opposite ends, said inlet extending to said aperture and being located intermediate the ends of the body, an extrusion die at one of the ends of the body, a stationary sleeve in the aperture of said body in alignment with the extrusion die, said sleeve having an outer periphery provided with at least one helical groove which opens into said inlet, said groove being bounded by the body at said aperture to define a closed cross-sectional flow path for the passage of extrudable material from the inlet to said extrusion die, said sleeve having an inclined surface at the bottom of said groove which increases in diameter in the direction of passage of the material, and a core tube in the sleeve for the passage of wire therethrough and to said extrusion die.

6. A cross head as claimed in claim 5 wherein said groove defines a thread, said thread having front and back surfaces, said surfaces having respective lengths as measured from the inlet in a particular ratio, said inclined surface of the sleeve having an inclination such that the front and back surfaces of the thread have a thread depth in the same ratio as the lengths of said surfaces.

7. A cross head as claimed in claim 5 wherein the core tube includes a threaded portion adjacent said extrusion die for advancing said material to said die and emptying said sleeve.

8. A cross head as claimed in claim 5 wherein said sleeve is provided with two parallel helical grooves opening into said inlet.

9. A cross head as claimed in claim 5 wherein said core tube and said extrusion die are provided with a plurality of aligned longitudinal bores for the passage of a plurality of wires therethrough.

10. Apparatus for producing twisted uniformly insulated wire comprising supply means for a pair of cores for a wire, extrusion means for receiving the cores from the supply means for individually covering said cores with a thin uniform insulating covering and twisting die means operatively positioned with respect to said extrusion means for receiving the individual cores with the covering thereon for twisting the same together to produce a twisted insulated wire, said extrusion means comprising a body having a longitudinal and transverse extent, said body having a longitudinal aperture and a lateral inlet, said body having opposite ends, said inlet extending to said aperture and being located intermediate the ends of the body, an extrusion die at one of the ends of the body, a stationary sleeve in the aperture of said body in alignment with the extrusion die, said sleeve having an outer periphery provided with at least one helical groove which opens into said inlet, said groove being bounded by the body at said aperture to define a closed cross-sectional flow path for the passage of extrudable material from the inlet to said extrusion die, said sleeve having an inclined surface at the bottom of said groove which increases in diameter in the direction of passage of the material, and a core tube in the sleeve, said core tube and said extrusion die being provided with a plurality of aligned longitudinal bores for the passage of a plurality of cores therethrough, said core tube being operatively positioned with respect to said supply means and said twisting die means for guidably advancing the cores from the supply means to the twisting die means along a path extending through the extrusion die such that said extrudable material is applied to the cores as a uniform covering at said extrusion die whereafter the thus covered cores are intertwisted at the twisting die means to form the twisted wire.

References Cited by the Examiner
UNITED STATES PATENTS

| | | | |
|---|---|---|---|
| 699,459 | 5/1902 | Dover | 18—13 |
| 2,235,688 | 3/1941 | Short | 18—13 X |
| 2,740,988 | 4/1956 | Henning | 18—13 |
| 2,794,213 | 6/1957 | Davis | 18—13 |
| 3,026,565 | 3/1962 | Bonner | 18—14 |

WILLIAM J. STEPHENSON, *Primary Examiner.*